| United States Patent [19] | [11] Patent Number: 4,495,303 |
|---|---|
| Kuehl | [45] Date of Patent: Jan. 22, 1985 |

[54] PROCESS FOR MAKING ZEOLITE ZSM-45 WITH A DIMETHYLDIETHYLAMMONIUM DIRECTING AGENT

[75] Inventor: Guenter H. Kuehl, Cherry Hill, N.J.

[73] Assignee: Mobil Oil Corporation, New York, N.Y.

[21] Appl. No.: 555,911

[22] Filed: Nov. 29, 1983

[51] Int. Cl.³ .............................................. C01B 33/28
[52] U.S. Cl. ................................. 502/62; 260/448 C; 423/328; 423/329; 502/77
[58] Field of Search ............................ 423/326–333; 502/60, 71, 77, 62; 260/448 C

[56] References Cited

U.S. PATENT DOCUMENTS

| 3,709,979 | 1/1973 | Chu | 423/328 |
|---|---|---|---|
| 3,832,449 | 8/1974 | Rosinski et al. | 423/328 |
| 4,372,930 | 2/1983 | Short et al. | 423/326 |
| 4,452,769 | 6/1984 | Chu et al. | 423/329 |

FOREIGN PATENT DOCUMENTS

| 0026963 | 4/1981 | European Pat. Off. | 423/329 |
|---|---|---|---|
| 0091048 | 10/1983 | European Pat. Off. | 423/328 |

*Primary Examiner*—Edward J. Meros
*Attorney, Agent, or Firm*—A. J. McKillop; M. G. Gilman; E. F. Kenehan, Jr.

[57] ABSTRACT

This invention relates to a method for preparing a synthetic porous crystalline aluminosilicate zeolite, characterized as zeolite ZSM-45. This crystalline material may have a silica to alumina molar ratio of at least 8. This synthetic zeolite is analogous, in some respects, to the naturally occurring zeolite, levynite. The ZSM-45 zeolite is prepared with a dimethyldiethylammonium directing agent. ZSM-45 exhibits a characteristic X-ray diffraction pattern.

6 Claims, No Drawings

PROCESS FOR MAKING ZEOLITE ZSM-45 WITH A DIMETHYLDIETHYLAMMONIUM DIRECTING AGENT

CROSS-REFERENCE TO RELATED APPLICATION

This application is related to copending U.S. application Ser. No. 425,019, filed Sept. 27, 1982, in the name of Edward J. Rosinski and Mae K. Rubin, which describes ZSM-45 and its preparation with a choline directing agent. The entire disclosure of this Ser. No. 425,019 application is expressly incorporated herein by reference.

BACKGROUND

This invention relates to a method of making a synthetic porous crystalline aluminosilicate zeolite, characterized as zeolite ZSM-45, with a dimethyldiethylammonium directing agent.

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic zeolites. The zeolites have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), ZSM-35 (U.S. Pat. No. 4,016,245), ZSM-38 (U.S. Pat. No. 4,046,859), and zeolite ZSM-23 (U.S. Pat. No. 4,076,842), merely to name a few.

The $SiO_2/Al_2O_3$ mole ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to infinity. U.S. Pat. No. 3,941,871 (Re.29,948) discloses a porous crystalline silicate made from a reaction mixture containing no deliberately added alumina in the recipe and exhibiting the X-ray diffraction pattern characteristic of ZSM-5 type zeolites. U.S. Pat. Nos. 4,061,724, 4,073,865 and 4,104,294 describe crystalline silicates or organosilicates of varying alumina and metal content.

A number of synthetic zeolites have been prepared which may be said to be isostructural with naturally occurring zeolites. Zeolites ZSM-35 and ZSM-38 are, for instance, ferrierite-type zeolites. Zeolite ZK-20 (U.S. Pat. No. 3,459,676) is described as being isostructural with the naturally occurring zeolite levynite. European Patent Application No. 40,016 and U.S. Pat. Nos. 4,361,715 and 4,372,930 describe synthetic zeolite Nu-3 which is levynite-type.

Although zeolites were originally most commonly defined as materials containing silica and alumina, it is recognized that the silica and alumina portions may be replaced in whole or in part with other oxides. More particularly, $GeO_2$ is an art recognized substitute for $SiO_2$ and $B_2O_3$, $Fe_2O_3$, and $Ga_2O_3$ are art recognized replacements for $Al_2O_3$. Accordingly, the term aluminosilicate zeolite as used herein shall defined materials consisting essentially of silicon and, optionally, aluminum atoms in the crystalline lattice structure thereof, as opposed to materials which contain substantial amounts of suitable replacement atoms for such silicon and/or aluminum.

The entire disclosures of the above-mentioned U.S. patents are also expressly incorporated herein by reference.

SUMMARY

The present invention is directed to a method of making a synthetic porous crystalline aluminosilicate zeolite, characterized as as ZSM-45. This form of zeolite ZSM-45 may be described as a high silica form of a levynite family of materials which exhibits a composition and properties which distinguish it from natural levynite. Zeolite ZSM-45 also exhibits a characteristic X-ray powder diffraction pattern which distinguishes it from other known synthetic and naturally occurring zeolites. It may be said to be levynite-type, however.

The porous crystalline zeolite ZSM-45, especially as calcined, is characterized by a distinctive X-ray diffraction pattern substantially as shown in Table 1 hereinafter. Zeolite ZSM-45 as prepared in accordance with the present invention generally has a silica to alumina moles ratio of at least 8. Preferably, there are from greater than 8 to about 100 moles of silica per mole of alumina.

Zeolite ZSM-45 may have a composition, on an anhydrous basis and in terms of moles of oxides per mole of $Al_2O_3$, expressed by the formula:

$$(1-2.6)M_{2/m}O:Al_2O_3:xSiO_2 \qquad (I)$$

wherein M represents one or more cations having valence m and x is at least 8. In the above formula (I), M can be a hydrogen cation, provided that said hydrogen cation is bound to an anionic site on tetrahedra of said zeolite containing aluminum atoms. Of course, if M represented hydrogen not bound to said anionic sites, $M_{2/m}O$ would represent $H_2O$ which is impossible, because formula I is expressed on an anhydrous basis.

The as synthesized form of ZSM-45 prepared in accordance with the present invention may have a composition, on an anhydrous basis and in terms of moles of oxides per mole of alumina, expressed by the formula:

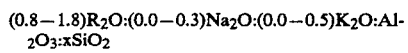

wherein $R_2O$ is the oxide of dimethyldiethylammonium ions and x is as defined hereinbefore.

In accordance with an aspect of the present invention, ZSM-45 is prepared from a reaction mixture containing sources of alkali metal ions (Z), an oxide of aluminum, an oxide of silicon, a dimethyldiethylammonium ion (DMDEA), and water. The reaction mixture may comprise an appropriate ZSM-45 formation selection of reactants, having a composition, in terms of mole ratios of oxides, falling within the following ranges:

| Reactants | Useful | Preferred |
|---|---|---|
| $SiO_2/Al_2O_3$ | 10–80 | 20–60 |
| $H_2O/OH^-$ | 15–100 | 20–80 |
| $OH^-/SiO_2$ | 0.40–0.80 | 0.50–0.70 |
| DMDEA/(DMDEA + Z) | 0.75–1.0 | 0.8–0.95 | wherein DMDEA and Z are as above defined.

Optionally, the reaction mixture may be essentially free of potassium ions.

DESCRIPTION OF SPECIFIC EMBODIMENTS

Crystallization of the zeolite ZSM-45 can be carried out at either static or stirred conditions in a suitable reactor vessel, such as for example, polypropylene jars or teflon lined or stainless steel autoclaves. A useful range of temperatures for crystallization is from about 80° C. to about 350° C. for a time of about 12 hours to about 145 days. Thereafter, the crystals are separated from the liquid and recovered. The composition can be prepared utilizing materials which supply the appropriate oxides. Such compositions may include sodium silicate, silica hydrosol, silica gel, silicic acid, sodium hydroxide, a source of aluminum, and an appropriate organic compound. It should be realized that the reaction mixture component oxides can be supplied from more than one source. The reaction mixture can be prepared either batchwise or continuously. Crystal size and crystallization time of the crystalline zeolite ZSM-45 will vary with the nature of the reaction mixture employed and the crystallization conditions.

In all cases, synthesis of the ZSM-45 crystals is facilitated by the presence of at least 0.01 percent, preferably 0.10 percent and still more preferably 1 percent, seed crystals (based on total weight) of crystalline product.

It will be readily understood by those of ordinary skill in the art that the above recitation of useful and preferred ranges of reactants does not constitute a warranty that all possible combinations of reactants falling within these ranges will automatically lead to the production of ZSM-45. Accordingly, one must select reactants and crystallization conditions in a manner sufficient to lead to the formation of ZSM-45. This selection will be readily enabled by the guidance provided herein, especially with regard to the Examples and Comparative Example recited hereinafter. In this regard, unsuccessful first attempts in the course of routine experimentation, which depart from the express reactant selections and conditions of the Examples recited hereinafter, could be followed by second attempts more closely corresponding with the express reactant selections and conditions of the Examples recited hereinafter.

It is further noted that the use of an appropriate seed crystal could theoretically change an otherwise non-ZSM-45 forming reactant mixture (e.g., a mixture capable of forming ZSM-12) to a mixture capable of forming ZSM-45.

The dimethyldiethylammonium directing agent used to form the ZSM-45 forming mixture may be in the form of, e.g., an hydroxide or halide, e.g., chloride, bromide or iodide.

The original alkali metal cations of the as synthesized ZSM-45 can be replaced in accordance with techniques well known in the art, at least in part, by ion exchange with other cations. Preferred replacing cations include metal ions, hydrogen ions, hydrogen precursor, e.g. ammonium, ions and mixtures thereof. Particularly preferred cations are those which render the ZSM-45 catalytically active, especially for hydrocarbon conversion. Replacing cations include hydrogen, rare earth metals and metals of Groups IA, IIA, IIIA, IVA, IB, IIB, IIIB, IVB and VIII of the Periodic Table of the Elements.

A typical ion exchange technique would be to contact the synthetic ZSM-45 with a salt of the desired replacing cation or cations. Examples of such salts incude the halides, e.g. chlorides, nitrates and sulfates.

Catalytically active zeolite ZSM-45 described and claimed herein has a definite X-ray diffraction pattern which distinguishes it from other crystalline materials. The X-ray diffraction pattern of zeolite ZSM-45, especially as calcined, has the following characteristic lines:

TABLE 1

| Interplanar D-Spacing (A) | Relative Intensity, I/Io |
|---|---|
| 11.34 ± 0.20 | Weak |
| 10.16 ± 0.18 | Weak |
| 8.02 ± 0.14 | Strong–Very Strong |
| 7.56 ± 0.14 | Weak |
| 6.55 ± 0.12 | Medium–Very Strong |
| 5.66 ± 0.10 | Weak |
| 5.50 ± 0.10 | Weak |
| 5.07 ± 0.09 | Medium–Strong |
| 4.95 ± 0.09 | Weak |
| 4.21 ± 0.08 | Medium–Strong |
| 4.01 ± 0.07 | Strong–Very Strong |
| 3.78 ± 0.07 | Medium–Strong |
| 3.60 ± 0.06 | Weak |
| 3.54 ± 0.06 | Weak–Medium |
| 3.42 ± 0.06 | Weak |
| 3.27 ± 0.06 | Medium |
| 3.11 ± 0.06 | Medium–Strong |
| 3.03 ± 0.05 | Weak |
| 2.812 ± 0.05 | Weak |
| 2.751 ± 0.05 | Medium–Strong |
| 2.583 ± 0.05 | Weak |
| 2.535 ± 0.05 | Weak |
| 2.521 ± 0.05 | Weak |
| 2.475 ± 0.04 | Weak |
| 2.405 ± 0.04 | Weak |
| 2.362 ± 0.04 | Weak |
| 2.251 ± 0.04 | Weak |
| 2.181 ± 0.04 | Weak |
| 2.133 ± 0.04 | Weak |
| 2.097 ± 0.04 | Weak |
| 2.029 ± 0.04 | Weak |

TABLE 1-continued

| Interplanar D-Spacing (A) | Relative Intensity, I/Io |
|---|---|
| 2.006 ± 0.03 | Weak |
| 1.889 ± 0.03 | Weak |
| 1.859 ± 0.03 | Weak |
| 1.843 ± 0.03 | Weak |
| 1.815 ± 0.03 | Weak |
| 1.765 ± 0.03 | Weak |
| 1.721 ± 0.03 | Weak |
| 1.710 ± 0.03 | Weak |
| 1.650 ± 0.03 | Weak |
| 1.637 ± 0.03 | Weak |
| 1.617 ± 0.03 | Weak |
| 1.606 ± 0.03 | Weak |
| 1.559 ± 0.03 | Weak |

These values were determined by standard techniques. The radiation was the K-alpha doublet of copper and a diffractometer equipped with a scintillation counter and an associated computer was used. The peak heights, I, and the positions as a function of 2 theta, where theta is the Bragg angle, were determined using algorithms on the computer associated with the spectrometer. From these, the relative intensities, 100 $I/I_o$, where $I_o$ is the intensity of the strongest line or peak, and d (obs.) the interplanar spacing in Angstrom units (A), corresponding to the recorded lines, were determined. In Table 1, the relative intensities are given in terms of the strongest line being taken as 100.0. It should be understood that this X-ray diffraction pattern is characteristic of all the species of zeolite ZSM-45 compositions. The sodium form as well as other cationic forms reveal substantially the same pattern with some minor shifts in interplanar spacing and variation in relative intensity. Other minor variations can occur, depending on the silicon to aluminum ratio of the particular sample, as well as its degree of thermal treatment.

Zeolite ZSM-45 sorbs significant amounts of commonly used test adsorbate materials, i.e. cyclohexane, n-hexane and water, whereas naturally occurring levynite is not expected to adsorb cyclohexane due to its pore structure. Sorption capacities for zeolite ZSM-45 may range at room temperature as follows:

| Adsorbate | Capacity, Wt. Percent |
|---|---|
| Cyclohexane | 2-5 |
| n-Hexane | 7-15 |
| Water | 14-25 | wherein cyclohexane and n-hexane sorption are measured at 20 Torr and water sorption is measured at 12 Torr.

The zeolite prepared in accordance with the present invention can be used either in the alkali metal form, e.g. the sodium or potassium form; the ammonium form; the hydrogen form or another univalent or multivalent cationic form. When used as a catalyst the zeolite will be subjected to thermal treatment to remove part or all of the organic constituent.

The zeolite can also be used as a catalyst in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be exchanged into the composition to the extent aluminum is in the structure, impregnated therein or intimately physically admixed therewith. Such component can be impregnated in or on to it such as for example, by, in the case of platinum, treating the zeolite with a solution containing a platinum metal-containing ion. Thus, suitable platinum compounds include chloroplatinic acid, platinous chloride and various compounds containing the platinum amine complex.

Zeolite ZSM-45, especially in its metal, hydrogen and ammonium forms can be beneficially converted to another form by thermal treatment. This thermal treatment is generally performed by heating one of these forms at a temperature of at least 370° C. for at least 1 minute and generally not longer than 20 hours. While subatmospheric pressure can be employed for the thermal treatment, atmospheric pressure is desired for reasons of convenience. The thermal treatment can be performed at a temperature up to about 925° C. The thermally treated product is particularly useful in the catalysis of certain hydrocarbon conversion reactions.

Zeolite ZSM-45, when employed either as an adsorbent or as a catalyst in an organic compound conversion process should be dehydrated, at least partially. This can be done by heating to a temperature in the range of 200° C. to 595° C. in an inert atmosphere, such as air, nitrogen, etc. and at atmospheric, subatmospheric or superatmospheric pressures for between 30 minutes and 48 hours. Dehydration can also be performed at room temperature merely by placing ZSM-45 in a vacuum, but a longer time is required to obtain a sufficient amount of dehydration.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

In the case of many catalysts, it is desired to incorporate the zeolize ZSM-45 with another material resistant to the temperatures and other conditions employed in organic conversion processes. Such materials include active and inactive material and synthetic or naturally occurring zeolites as well as inorganic materials such as clays, silica and/or metal oxides, e.g. alumina. The latter may be either naturally occurring or in the form of gelatinous precipitates or gels including mixtures of silica and metal oxides. Use of a material in conjunction with the ZSM-45 crystal, i.e. combined therewith, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occuring clays which can be composited with the new crystal include the montmorillonite and kaolin families which include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present crystal also include inorganic oxides, notably alumina.

In addition to the foregoing materials, the zeolite ZSM-45 can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The relative proportions of finely divided crystalline material and inorganic oxide gel matrix vary widely, with the zeolite content ranging from about 1 to about 90 percent by weight and more usually, particularly when the composite is prepared in the form of beads, in the range of about 2 to about 80 weight percent of the composite.

Zeolite ZSM-45 is useful as catalyst component for a variety of organic, e.g. hydrocarbon, compound conversion processes. Such conversion processes include, as non-limiting examples, cracking hydrocarbons with reaction conditions including a temperature of from about 300° C. to about 700° C., a pressure of from about 0.1 atmosphere (bar) to about 30 atmospheres and a weight hourly space velocity of from about 0.1 to about 20; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g. benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g. methanol, or ethers, e.g. dimethylether, or mixtures thereof to hydrocarbons including aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components with reaction conditions including a temperature of from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g. benzene and alkylbenzenes, in the presence of an alkylating agent, e.g. olefins, formaldehyde, alkyl halides and alcohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

In order to more fully illustrate the nature of the invention and the manner of practicing same, the following examples are presented. In the examples, whenever adsorption data are set forth for comparison of sorptive capacities for water, cyclohexane and/or n-hexane, they were determined as follows:

A weighed sample of the calcined adsorbant was contacted with the desired pure adsorbate vapor in an adsorption chamber, evacuated to 1 mm and contacted with 12 mm Hg of water vapor or 20 mm Hg of n-hexane, or cyclohexane vapor, pressures less than the vapor-liquid equilibrium pressure of the respective adsorbate at room temperature. The pressure was kept constant (within about ±0.5 mm) by addition of adsorbate vapor controlled by a manostat during the adsorption period, which did not exceed about 8 hours. As adsorbate was adsorbed by the new crystal, the decrease in pressure caused the manostat to open a valve which admitted more adsorbate vapor to the chamber to restore the above control pressures. Sorption was complete when the pressure change was not sufficient to activate the manostat. The increase in weight was calculated as the adsorption capacity of the sample in g/100 g of calcined adsorbant.

EXAMPLE 1

This Example demonstrates the preparation of ZSM-45 with a dimethyldiethylammonium directing agent. Sodium aluminate (29.8 percent $Na_2O$, 41.8 percent $Al_2O_3$), 0.5 g, was dissolved in 40.5 g of a 20 percent dimethyldiethylammonium hydroxide solution. A 50 percent sodium hydroxide solution, 0.5 g, and, finally, 8.3 g of Hi-Sil, a precipitated silica containing about 87 percent $SiO_2$, were added. The reaction mixture had the following composition:

| | |
|---|---|
| $SiO_2/Al_2O_3 =$ | 60 |
| $(Na_2O + DMDEA_2O)/SiO_2 =$ | 0.32 |
| $Na_2O/(Na_2O + DMDEA_2O) =$ | 0.14 |
| $H_2O/(Na_2O + DMDEA_2O) =$ | 48 |

The mixture was heated at 130° C. for 23 days. A sample of the product was dried at room temperature. This dried sample gave the X-ray diffraction pattern listed in Table 2.

TABLE 2

| Degrees Two Theta | Interplanar D-Spacing (A) | Relative Intensity, I/Io |
|---|---|---|
| 8.69 | 10.18 | 12 |
| 11.01 | 8.04 | 40 |
| 11.73 | 7.54 | 8 |
| 13.46 | 6.58 | 38 |

TABLE 2-continued

| Degrees Two Theta | Interplanar D-Spacing (A) | Relative Intensity, I/Io |
|---|---|---|
| 16.05 | 5.52 | 6 |
| 17.44 | 5.08 | 69 |
| 17.81 | 4.98 | 21 |
| 21.18 | 4.20 | 47 |
| 22.09 | 4.02 | 100 |
| 23.43 | 3.80 | 28 |
| 25.26 | 3.53 | 3 |
| 27.13 | 3.29 | 21 |
| 28.77 | 3.10 | 33 |
| 29.31 | 3.05 | 12 |
| 32.04 | 2.793 | 11 |
| 32.41 | 2.762 | 36 |
| 34.78 | 2.579 | 8 |
| 35.00 | 2.564 | 5 |
| 36.14 | 2.485 | 2 |
| 38.42 | 2.343 | 3 |
| 39.80 | 2.265 | 3 |
| 41.13 | 2.194 | 2 |
| 42.37 | 2.133 | 3 |
| 43.02 | 2.102 | 5 |
| 44.92 | 2.018 | 3 |
| 45.15 | 2.008 | 4 |
| 48.50 | 1.877 | 4 |
| 49.26 | 1.850 | 5 |
| 50.07 | 1.822 | 5 |
| 51.85 | 1.763 | 8 |
| 55.91 | 1.644 | 7 |
| 59.05 | 1.564 | 3 |

The product was calcined for 4 hours at 500° C. The calcined product gave the X-ray diffraction pattern listed in Table 3. It still contained an amorphous impurity and had the following sorption capacities, g/100 g.

| | |
|---|---|
| Cyclohexane, 20 Torr | 3.6 |
| n-Hexane, 20 Torr | 14.8 |
| Water, 12 Torr | 16.7 |

The chemical composition of the sample dried at room temperature was, wt. percent:

| | |
|---|---|
| $SiO_2$ | 70.0 |
| $Al_2O_3$ | 4.4 |
| $Na_2O$ | 0.73 |
| N | 2.30 |
| Ash | 76.9 |
| $SiO_2/Al_2O_3$, molar | 27.0 |

TABLE 3

| Degrees Two Theta | Interplanar D-Spacing (A) | Relative Intensity, I/Io |
|---|---|---|
| 8.73 | 10.13 | 18 |
| 11.05 | 8.01 | 85 |
| 11.73 | 7.54 | 12 |
| 13.55 | 6.54 | 100 |
| 16.15 | 5.49 | 4 |
| 17.53 | 5.06 | 35 |
| 17.90 | 4.96 | 10 |
| 21.12 | 4.21 | 41 |
| 22.19 | 4.01 | 84 |
| 23.60 | 3.77 | 25 |
| 25.36 | 3.51 | 7 |
| 26.10 | 3.41 | 7 |
| 27.27 | 3.27 | 22 |
| 28.72 | 3.11 | 35 |
| 29.46 | 3.03 | 9 |
| 31.90 | 2.805 | 8 |
| 32.58 | 2.749 | 41 |
| 34.78 | 2.579 | 8 |
| 35.03 | 2.562 | 3 |

TABLE 3-continued

| Degrees Two Theta | Interplanar D-Spacing (A) | Relative Intensity, I/Io |
|---|---|---|
| 36.33 | 2.473 | 3 |
| 38.49 | 2.339 | 1 |
| 40.01 | 2.254 | 2 |
| 41.36 | 2.183 | 3 |
| 42.39 | 2.132 | 2 |
| 43.21 | 2.094 | 4 |
| 44.75 | 2.025 | 2 |
| 45.15 | 2.008 | 2 |
| 48.22 | 1.887 | 2 |
| 49.18 | 1.853 | 4 |
| 50.36 | 1.812 | 2 |
| 51.91 | 1.761 | 8 |
| 56.10 | 1.639 | 5 |
| 59.45 | 1.555 | 3 |

It is noted that when dimethyldiethylammonium directing agents are used, sufficiently higher $SiO_2:Al_2O_3$ ratios than employed in this Example may lead to the production of ZSM-12 in addition to or instead of ZSM-45. Similarly, when a DMDEA directing agent is used, sufficiently lower $SiO_2:Al_2O_3$ ratios than employed in this Example may lead to the production of zeolite Y in addition to or instead of ZSM-45.

EXAMPLE 2

One gram of sodium aluminate (29.8 percent $Na_2O$, 41.8 percent $Al_2O_3$) was dissolved in 37.25 g of 20 percent aqueous dimethyldiethylammonium hydroxide solution. Hi-Sil (87 percent $SiO_2$), 8.3 g, was added and dispersed. The reaction mixture had the following composition:

| | |
|---|---|
| $SiO_2/Al_2O_3$ | 26.45 |
| $(Na_2O + DMDEA_2O)/SiO_2$ | 0.30 |
| $Na_2O/(Na_2O + DMDEA_2O)$ | 0.133 |
| $H_2O/(Na_2O + DMDEA_2O)$ | 49 |
| $OH^-/SiO_2$ | 0.60 |

The mixture was heated at 160° C. in an autoclave at autogenous pressure.

A crystalline product was obtained after 21 days. It consisted mainly of ZSM-45, but contained a trace of an unidentified crystalline material. It had the following sorption capacities, g/100 g:

| | |
|---|---|
| Cyclohexane, 20 torr | 2.1 |
| n-Hexane, 20 torr | 13.5 |
| Water, 12 torr | 19.8 |

The chemical composition was, wt. percent:

| | |
|---|---|
| $SiO_2$ (by difference) | 71.1 |
| $Al_2O_3$ | 6.4 |
| $Na_2O$ | 0.38 |
| N | 2.21 |
| Ash | 77.9 |
| $SiO_2/Al_2O_3$, molar | 18.9 |

COMPARATIVE EXAMPLE A

This Comparative Example demonstrates the preparation of ZSM-12 using a dimethyldiethylammonium directing agent and a comparatively high ratio of silica to alumina. Aluminum nitrate, $Al(NO_3)_3.9H_2O$, 1.6 g, was dissolved in 180 g of water. Diethyldimethylammonium bromide, (C₂H₅)₂(CH₃)₂N Br, 16.9 g, was added and dissolved. A solution of 5 g of sodium hydroxide in 50 g of water and, finally, 48 g of Hi-Sil were added. The reaction mixture was digested at ambient temperature for 24 hours and then heated at 150° C. for crystallization for 10 days. The reaction mixture composition can be summarized as follows:

| | |
|---|---|
| SiO$_2$/Al$_2$O$_3$ = | 388 |
| Na$_2$O/(Na$_2$O + DEDMA$_2$O) = | 0.57 |
| (Na$_2$O + DEDMA$_2$O)/SiO$_2$ = | 0.15 |
| OH$^-$/SiO$_2$ = | 0.15 |
| H$_2$O/(Na$_2$O + DEDMA$_2$O) = | 122 |

The crystalline product was filtered, washed with water and dried at ambient temperature. It gave the X-ray diffraction pattern of ZSM-12 having good crystallinity compared with a reference sample. The sorption capacities, in g/100 g, were:

| | |
|---|---|
| Cyclohexane, 20 Torr | 6.8 |
| n-Hexane, 20 Torr | 6.5 |
| Water, 12 Torr | 6.4 |

The chemical composition of the product was, in weight percent:

| | |
|---|---|
| SiO$_2$ | 88.8 |
| Al$_2$O$_3$ | 1.05 |
| Na$_2$O | 0.59 |
| N | 1.16 |
| Ash | 90.8 |
| SiO$_2$/Al$_2$O$_3$ | 144 |

What is claimed is:

1. A method for preparing a synthetic porous crystalline aluminosilicate zeolite, said aluminosilicate zeolite having a silica to alumina ratio of at least 8, said aluminosilicate zeolite as calcined further being characterized by an X-ray diffraction pattern exhibiting values substantially as set forth in Table 1 of the specification, said method comprising preparing a mixture capable of forming said aluminosilicate zeolite, said mixture containing sources of alkali metal ions, an oxide of aluminum, an oxide of silicon, a dimethyldiethylammonium ion and water and having a composition in terms of moles of oxides, falling within the following ranges:

| | |
|---|---|
| SiO$_2$/Al$_2$O$_3$ | 10–80 |
| H$_2$O/OH$^-$ | 15–100 |
| OH$^-$/SiO$_2$ | 0.40–0.80 |
| DMDEA/(DMDEA + Z) | 0.75–1.0 | wherein DMDEA represents said dimethyldiethylammonium ion and Z represents said alkali metal ion, and maintaining said mixture under sufficient conditions until said crystalline aluminosilicate zeolite is formed.

2. A method according to claim 1, wherein said mixture has a composition, in terms of moles of oxides, falling within the following ranges:

| | |
|---|---|
| SiO$_2$/Al$_2$O$_3$ | 20–60 |
| H$_2$O/OH$^-$ | 20–80 |
| OH$^-$/SiO$_2$ | 0.50–0.70 |
| DMDEA/(DMDEA + Z) | 0.8–0.95. |

3. A method according to claim 1, wherein said mixture is essentially free of potassium ions.

4. A method according to claim 1, wherein said mixture further comprises a sufficient amount of ZSM-45 formation enhancing seed crystals.

5. A synthetic porous crystalline aluminosilicate zeolite having a composition, on an anhydrous basis and in terms of moles of oxides per mole of alumina, expressed by the formula:

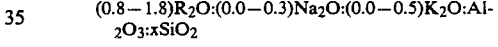

$(0.8-1.8)R_2O:(0.0-0.3)Na_2O:(0.0-0.5)K_2O:Al_2O_3:xSiO_2$ wherein R$_2$O is the oxide of dimethyldiethylammonium ions and x is at least 8, said aluminosilicate zeolite as calcined being characterized by an X-ray diffraction pattern exhibiting values substantially as set forth in Table 1 of the specification.

6. An aluminosilicate zeolite according to claim 5, which is essentially free of potassium.

* * * * *